(12) United States Patent
Cohen et al.

(10) Patent No.: US 10,845,258 B2
(45) Date of Patent: Nov. 24, 2020

(54) METHOD OF PROCESSING DATA RECEIVED FROM A SMART SHELF AND DERIVING A CODE

(71) Applicant: Touchcode Holdings, LLC, New York, NY (US)

(72) Inventors: Steven Martin Cohen, New York, NY (US); Wayne L. Nemeth, Rye, NY (US); Michael A. Brody, Philadelphia, PA (US); Lev M. Barsky, New York, NY (US)

(73) Assignee: Touchcode Holdings, LLC, New York, NY (US)

( * ) Notice: Subject to any disclaimer, the term of this patent is extended or adjusted under 35 U.S.C. 154(b) by 0 days.

(21) Appl. No.: 15/274,485

(22) Filed: Sep. 23, 2016

(65) Prior Publication Data

US 2017/0234746 A1    Aug. 17, 2017

Related U.S. Application Data

(60) Provisional application No. 62/232,328, filed on Sep. 24, 2015.

(51) Int. Cl.

| | |
|---|---|
| *G01L 1/20* | (2006.01) |
| *G06F 3/045* | (2006.01) |
| *G01L 27/00* | (2006.01) |
| *G06F 3/041* | (2006.01) |
| *G01L 25/00* | (2006.01) |
| *G01L 1/22* | (2006.01) |
| *G06Q 10/08* | (2012.01) |

(52) U.S. Cl.
CPC ............. *G01L 1/205* (2013.01); *G01L 25/00* (2013.01); *G01L 27/005* (2013.01); *G06F 3/045* (2013.01); *G06F 3/0414* (2013.01); *G01L 1/2206* (2013.01); *G06Q 10/087* (2013.01)

(58) Field of Classification Search
CPC ....................................................... G01L 1/205
USPC ......................................................... 700/244
See application file for complete search history.

(56) References Cited

U.S. PATENT DOCUMENTS

| | | | |
|---|---|---|---|
| 4,552,396 A * | 11/1985 | Rais | ..................... B65D 23/106 |
| | | | 215/396 |
| 4,866,412 A | 9/1989 | Rzepczynski | |
| 6,029,358 A | 2/2000 | Mathiasmeier et al. | |
| 10,548,418 B2 | 2/2020 | Gentile et al. | |
| 2003/0039381 A1 | 2/2003 | Ziesig | |
| 2009/0319399 A1 * | 12/2009 | Resta | ..................... G06Q 10/00 |
| | | | 705/28 |
| 2015/0309651 A1 | 10/2015 | Papakostas | |
| 2017/0234746 A1 * | 8/2017 | Cohen | ..................... G01L 1/205 |
| | | | 73/1.08 |

* cited by examiner

*Primary Examiner* — Walter L Lindsay, Jr
*Assistant Examiner* — Philipmarcus T Fadul
(74) *Attorney, Agent, or Firm* — Wolf, Greenfield & Sacks, P.C.

(57) ABSTRACT

A method of reading and quantifying pressure points or bumps or a product outline to extract a pattern that, when decoded, uniquely defines a product or class of products by defining the theoretical centers of applied pressure, determining the spatial relationship between more than one center or a product outline to define which pattern belongs to which product, and correlating each pattern with templates of stored patterns to determine what product is represented by each respective pattern.

17 Claims, 9 Drawing Sheets

| MONTH | 1 | 2 | 3 | 4 | 5 | 6 | 7 | 8 | 8 | 10 | 11 | 12 |
|---|---|---|---|---|---|---|---|---|---|---|---|---|
| VALUE | 2 | 2 | 3 | 5 | 5 | 4 | 5 | 6 | 8 | 8 | 9 | 10 |

METHOD OF PROCESSING DATA RECEIVED FROM A SMART SHELF AND DERIVING A CODE

CROSS-REFERENCE TO RELATED APPLICATIONS

The present application claims priority under 35 U.S.C. § 119(e) to U.S. Provisional Patent Application Ser. No. 62/232,328, titled "Method of Processing Data Received from a Smart Shelf and Deriving a Code" and filed Sep. 24, 2015, the entire contents of which are incorporated herein by reference.

FIELD

Some embodiments relate to techniques for identifying products positioned on a surface based on unique signatures produced by weight applied to the surface by the products.

BACKGROUND

A smart shelf may include a planar matrix of weight sensing elements that can detect weight placed upon a surface at sufficient resolution that the outline of a package or item can be sensed. Smart shelves have been demonstrated with a $1/10^{th}$ inch horizontal resolution and a $1/10^{th}$ inch vertical resolution, though a smart shelf is not limited to this resolution and can be more or less in each dimension depending on the application. Smart shelves have been made that can sense that a switch closure has occurred at a cross-point, say at the xth horizontal location and the yth vertical location. Such a switch closure occurs when a force above a certain threshold is produced, as below that force or weight the switch would be predominantly open or a high resistance and above that force or weight the switch would be predominantly closed or a low resistance. This enables analog and/or digital circuitry to determine the difference between an open switch and a closed switch, and to assign a digital high or low to an event producing or not producing a certain threshold level of force at a certain location or region of area across the surface. An object located on a smart shelf could produce a series of switch closures that would sense or reflect or represent the outline or footprint of a package, or the location of a series of bumps that contact the surface of the smart shelf.

Other smart shelf embodiments have been realized where force sensing resistors (FSRs) are located at the cross-points within an area matrix. In this embodiment, it is possible to detect a variable value of resistance as a function of force applied in any particular spot or region. FSRs are non-linear devices, and there is a non-linear relationship between force and the corresponding resistance.

SUMMARY

In some embodiments, there is provided a method of identifying an item disposed on a surface, wherein the surface comprises an array of sensors for detecting contact with the surface, the item having a bottom contacting the surface, wherein the method comprises determining, using the array of sensors to detect contact of the bottom of the item with the surface, a set of points of contact between the surface and the bottom of the item; comparing the set of points of contact to one or more known arrangements in points of contact between one or more known items and the surface; and based at least in part on at least one result of the comparing, determining whether the item is at least one of the one or more known items.

In some embodiments, determining the set of points of contact comprises, with the array of sensors, identifying a reference shape in contact between the surface and the bottom; with the array of sensors, identifying one or more additional shapes embedded in the bottom of the item; and determining the set of points of contact based at least in part on the one or more additional shapes embedded in or attached to the bottom of the item.

In some embodiments, identifying the reference shape comprises identifying a pattern embedded in the bottom of the item; and identifying the one or more additional shapes comprises identifying the one or more additional shapes based on a position and/or orientation of the item on the surface as determined from the reference shape.

In some embodiments, identifying the reference shape comprises identifying one or more first raised shapes embedded in the bottom of the item.

In some embodiments, identifying the one or more additional shapes comprises identifying one or more second raised shapes embedded in the bottom of the item.

In some embodiments, identifying the reference shape comprises identifying one or more first raised and/or indented shapes embedded in the bottom of the item; and identifying the one or more additional shapes comprises identifying one or more second raised and/or indented shapes embedded in the bottom of the item.

In some embodiments, identifying a reference shape comprises identifying an outer perimeter of contact between the bottom of the item and the surface; and identifying the one or more additional shapes comprises identifying the one or more additional shapes within the outer perimeter.

In some embodiments, determining the set of points of contact comprises analyzing the contact between the bottom of the item and the surface to determine at least one code; and comparing the set of points of contact to the one or more known arrangements in points of contact comprises comparing the at least one code to one or more known codes.

In some embodiments, determining the set of points of contact comprises detecting, using the array of sensors, a force imposed by the item on the surface at different points and locations of the different points.

In some embodiments, detecting the weight of the item at different points comprises determining, from a weight value output by one or more sensors of the array of sensors, a normalized weight value.

In some embodiments, comparing the set of points of contact to the one or more known arrangements in points of contact comprises comparing forces and locations for each point of the set of points of contact to the one or more known arrangements, wherein each known arrangement identifies a set of forces and respective locations of forces.

In some embodiments, determining the set of points of contact using the array of sensors comprises determining the set of points using an array of force-sensing resistors (FSRs).

In some embodiments, determining a point of contact, of the set of points of contact, comprises determining a cluster of sensor readings using the array of sensors, the cluster of sensor readings corresponding to a feature of the item contacting the surface; and determining the point of contact corresponding to the cluster of sensor readings to be a center of the cluster of sensor readings.

In some embodiments, determining the point of contact corresponding to the cluster of sensor readings to be a center of the cluster of sensor readings comprises determining the point of contact corresponding to the cluster of sensor readings from an analysis of a distribution of locations and/or values of the sensor readings of the cluster of sensor readings.

In some embodiments, the method further comprises repeating the method a plurality of times to identify a plurality of items disposed on the shelf; and outputting inventory information regarding the plurality of items disposed on the shelf, the inventory information identifying the plurality of items.

In some embodiments, repeating the method comprises repeating the method for a second plurality of items disposed on a second plurality of surfaces, each surface of the second plurality of surfaces comprising an array of the sensors.

In some embodiments, the method further comprises, in response to identifying the item as one of the one or more known items, determining whether the surface is a proper location for the item to be disposed; and in response to determining that the item is not properly disposed on the surface, outputting a message identifying that the item is improperly disposed on the surface.

In some embodiments, there is provided a method of calibrating an array of pressure sensitive sensors, the method comprising detecting, using the array of pressure sensitive sensors, at least one first area of the array on which are disposed one or more items and a second area of the area on which no item is disposed; detecting one or more values output by one or more sensors of the array in the second area while no item is disposed on the second area; and calibrating the one or more sensors of the array in the second area based at least in part on the one or more values output by the one or more sensors.

In some embodiments, calibrating the one or more sensors of the second area further comprises calibrating one or more second sensors, of the array of pressure sensitive sensors, outside the second area based at least in part on the one or more values output by the one or more sensors.

In some embodiments, wherein calibrating the one or more sensors of the second area further comprises calibrating all sensors, of the array of pressure sensitive sensors, based at least in part on the one or more values output by the one or more sensors.

In some embodiments, wherein detecting the at least one first area and the second area comprises evaluating values output by sensors of the array to identify sensors for which a value is indicative of a force imposed on the sensor; and identifying the at least one first area on which are disposed one or more items based on locations of sensors having values indicative of imposed force.

In some embodiments, the method further comprises repeating the method over time to calibrate an entirety of the array over time.

In some embodiments, the method further comprises recording, in at least one data store, an indication of a time that the one or more sensors of the second area were calibrated; determining whether the at least one data store indicates that more than a threshold amount of time has passed since a portion of the array was calibrated; and, in response to determining that more than the threshold amount of time has passed since the portion of the array was calibrated, outputting a message identifying the portion and indicating that a calibration of the portion should be performed.

In some embodiments, the array of pressure sensitive sensors is an array of force-sensitive resistors (FSRs).

In some embodiments, there is provided a method of calibrating an array of pressure sensitive sensors, the method comprising identifying an item disposed on a first area of the array, wherein identifying the item comprises determining, using the array, a set of points of contact between the array and a bottom of the item, comparing the set of points of contact to one or more known arrangements in points of contact between one or more known items and the array, and based on a result of the comparing, identifying the item as one of the one or more known items; determining one or more expected values for one or more sensors of the first area of the array when the item is disposed on the array; and calibrating the one or more sensors of the first area based at least in part on the one or more expected values.

In some embodiments, the method further comprises calibrating one or more other sensors of the array, outside the first area, based at least in part on the one or more expected values.

In some embodiments, calibrating the one or more sensors comprises calibrating all sensors of the array based at least in part on the one or more expected values.

In some embodiments, the method further comprises recording, in at least one data store, an indication of a time that the one or more sensors of the first area were calibrated; determining whether the at least one data store indicates that more than a threshold amount of time has passed since a portion of the array was calibrated; and in response to determining that more than the threshold amount of time has passed since the portion of the array was calibrated, outputting a message identifying the portion and indicating that a calibration of the portion should be performed.

In some embodiments, the array of pressure sensitive sensors is an array of force-sensitive resistors (FSRs).

In some embodiments, a point of contact, of the set of points of contact, corresponds to multiple sensors of the array of sensors.

In some embodiments, there is provided a method including a combination of any of the foregoing embodiments.

In some embodiments, there is provided at least one non-transitory storage medium having encoded thereon executable instructions that, when executed by at least one processor, cause the at least one processor to carry out the method of any of the foregoing embodiments.

In some embodiments, there is provided an apparatus comprising at least one processor; and at least one non-transitory storage medium having encoded thereon executable instructions that, when executed by the at least one processor, cause the at least one processor to carry out the method of any of the foregoing embodiments.

DESCRIPTION

A/D converter may refer to a device that converts an analog voltage (or current in some cases) into a digital number that represents that analog voltage. An 8 bit A/D converter can quantify 256 possible voltages over the voltage range to be quantified. A 16 bit converter can quantify 65,536 voltages over the voltage range to be quantified. A 5 volt signal can be resolved into 0.01953 volts per count with an 8 bit converter, and a 16 bit can resolve the same 5 volt range into 0.00007629 volts per count.

Figure 2:
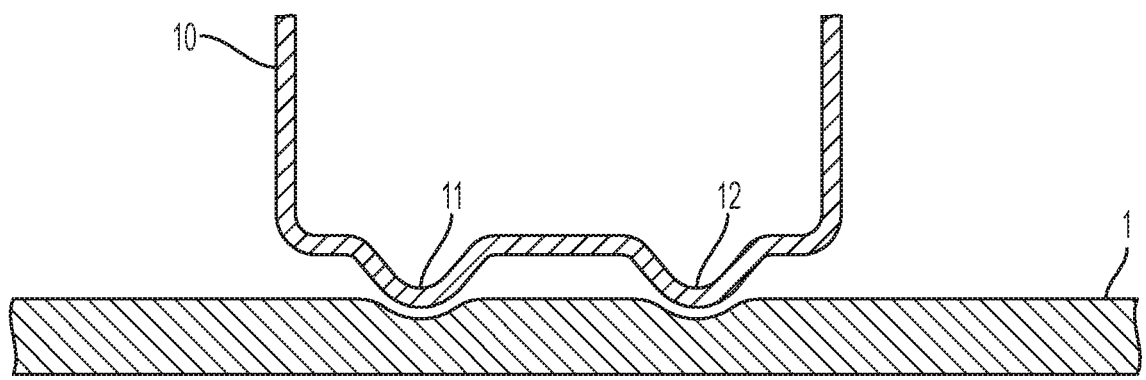
FIG. 2 depicts a cross-sectional view of an object like a bottle with two bumps or surface features that apply force to a smart shelf.
Figure 4:
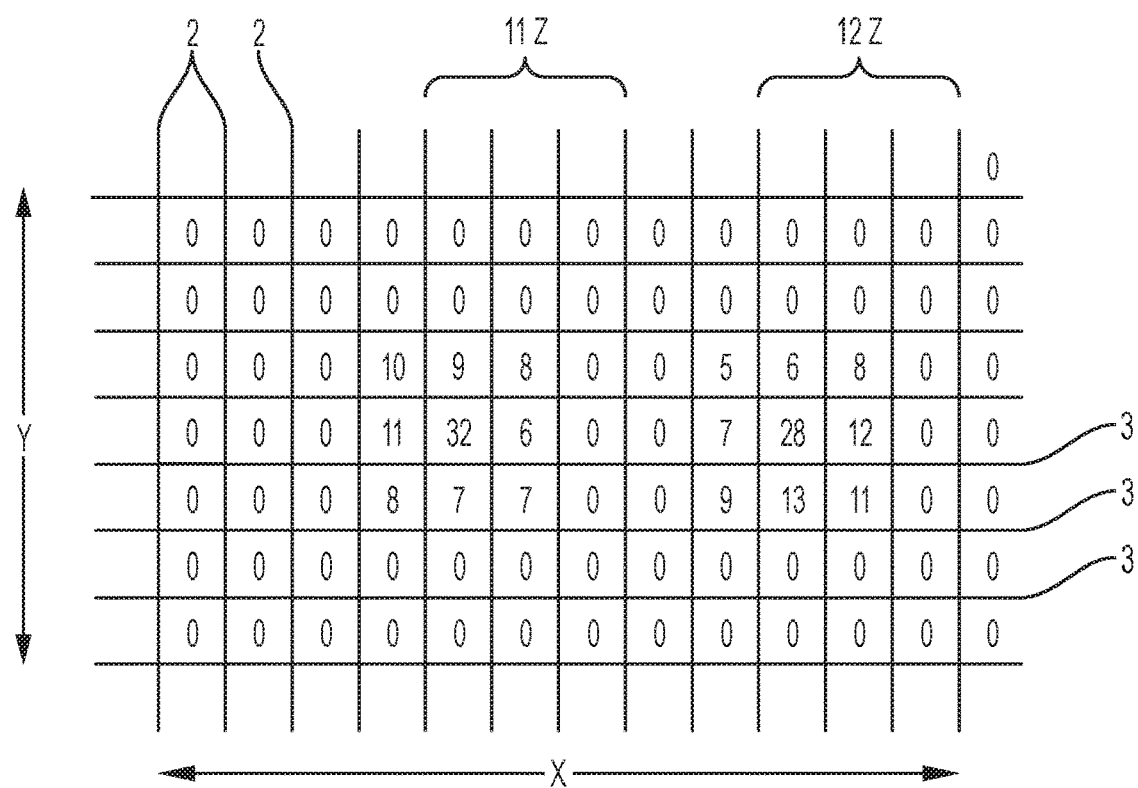
FIG. 4 depicts an area matrix wherein each pixel of weight sensing has a value, and there are two clusters of values representing the two bumps depicted in FIG. 2, but generally following the continuous curves depicted in FIG. 3.

A "bump" may refer to a single bump used in a mechanical code as might be represented as first bump 11 and second bump 12 in FIG. 2. A bump is initially acquired as a collection of pixel as might be depicted in first bump zone of influence 11Z corresponding to first bump 11 and second bump zone of influence 12Z corresponding to second bump 12 as depicted in FIG. 4. A bump may be represented by a single center position Cx, y, and this center, after calculation may reside between actual pixel boundaries. The bump center is the single location of a single bump, defined in two coordinates, and this position may be used for code extraction. It may in some embodiments be convenient to define a bump center in X and Y rectilinear coordinates or it may in other embodiments be convenient to define a bump center relative to at least one other bump center in polar coordinates comprising radius or distance between two bump centers and the angle of the line passing through two bump centers and at least one other axis which can be a datum axis that may or may not be or be parallel to the X and/or Y axis of the smart shelf. A bump may also be any shape that can register on a pressure sensitive area and/or a pressure sensitive area comprised of pressure sensitive pixels that can register pressure and/or force applied over an area and take the form of pixels in a cluster of pixels that can form an overall shape. A bump is not necessarily round, and can be round, oval, square, rectangular, triangular, annular, or any geometric shape whatsoever. A bump can be a collection of bumps as well. A bump can also either be the absence of an outward facing bump and/or a negative facing bump that does not touch or impinge upon a pressure sensitive surface. For instance, a first geometric shape that protrudes from the bottom of a weight bearing object can have contained within a second geometric shape contained completely and/or partially within the first geometric shape. For instance, and for example only, the first geometric shape can be a square, and the second geometric shape can be a circle of empty or negative space contained within the square, so the pressure sensitive pixels of a smart shelf could register as a square and not registering the circle within the square. This may be used to generate at least one code, to increase the resolution of at least one code, and/or can be used to register at least one location and/or a datum.

A "code" may refer to an identifier that may be extracted from a collection of bumps and corresponding positions for an item (including a product) placed on a smart shelf. If two identical items are placed on a smart shelf, they may be at random orientations to the shelf and to each other. As discussed below, in some embodiments, a code may be used to identify an item on a smart shelf. For example, bumps on each respective item may be isolated, centers determined, and the pattern quantified for comparison to a set of known codes representing a number of different items, so as to identify the item on the smart shelf.

A "conductor" may refer to a conductive layer either as a single conductor or conductive layer or a conductive subassembly comprising a conductor or conductive layer and a non-conductive coating on top. The conductive layer can also incorporate a Z-axis deposition or film. A conductor can be hot or cold transferred, hot or cold stamped, a foil, sputtered a conductive material, vacuum metalized deposition, or a die cut foil attached with adhesive.

A "film" may refer to at least one of an elastomer, a thermoplastic polyurethane (TPU), silicone rubber, Mylar, a urethane, plastisol, a material with homogenous and/or non-homogenous stretch characteristics.

"Z-axis coating" may refer to a material coated over an area with X and Y dimensions, and the Z-axis coating may have a lower resistance in the Z direction than in the X and Y directions, where the Z direction is perpendicular to the X and Y directions. For example, if a first conductive material and a second conductive material were to be applied to an insulating substrate and a second conductive material were to be parallel to and not touching the first conductive material, and a Z-axis coating were to be applied to the first conductive material and the second conductive material and substrate, then there would be a lower resistance between the first conductive material and a third conductor located on the Z-axis coating directly above the first conductive material than there would be between the first conductive material and the second conductive material. A Z-axis coating can be a coating with non-homogenous resistive properties or simply be a homogeneous material with a resistivity that, when applied between a pair of conductors, enables current to flow between the pair of conductors and through the Z-axis coating. If the Z-axis coating were coated on another resistive material, the total resistance would be the series resistance of said another resistive material and the Z-axis coating.

A "Force Sensing Resistor" may refer to a resistive element or component that changes resistance as a function of applied force or weight. As the weight increases, the resistance goes down. With no weight applied, an FSR may have some steady-state resistance. As weight is applied, the resistance will drop, usually in a non-linear manner, until a maximum force level produces a minimum resistance. Further addition of weight or force beyond this maximum produces little or no decrease in resistance, and therefore it is desirable to remain within the operating range of the FSR.

A "pixel" may refer to a single cell of applied weight or applied force within a smart shelf. This may be the smallest unit that can be detected. If the sensing matrix within a smart shelf is composed of a grid of vertically-oriented conductors in the Y direction and horizontally-oriented conductors in the X direction and there are a total of Ymax number of vertical lines and Xmax number of horizontal lines, then the smart shelf matrix may contain (Ymax)(Xmax) total number of pixels. Any specific pixel can be designated as the Px,y, where x is the x component and y is the y component. An alternative designation when used in the context of indexing is Pi,j, where i is the x component and j is the y component. The lower left-most pixel of a smart shelf can be designated as pixel $P_{1,1}$; the upper left-most pixel can be $P_{1, Ymax}$; the lower right-most pixel can be $P_{Xmax, 1}$; and the upper right-most pixel can be $P_{Xmax, Ymax}$.

A "petaloid" may refer to a portion of a container or a bottle that forms a raised section that contacts a shelf when the container or a bottle is placed upon the shelf. In this region, a mechanical code may be embedded in some embodiments, because this is the farthest extending portion of the container. In one embodiment, the bumps forming a code would be located on a series of petaloids.

"Normalization" may refer to a process by which a pixel's value is quantified and linearized to produce value of the weight or a representative number linearly proportional to weight. Because the relationship between weight and resistance for an FSR is roughly a hyperbolic function (force×resistance=constant), it may be advantageous in some embodiments to linearize or otherwise normalize the value of force detected by an SR to produce values in a consistent coordinate system, which might be used for adding values for calculation purposes.

DETAILED DESCRIPTION

In some embodiments, there is provided a method of identifying an item disposed on a surface. The surface may include an array of sensors for detecting contact with the surface. The item may have a bottom contacting the surface. The method comprises determining, using the array of sensors to detect contact of the bottom of the item with the surface, a set of points of contact between the surface and the bottom of the item. The method may further comprise comparing the set of points of contact to one or more known arrangements in points of contact between one or more known items and the surface and, based at least in part on at least one result of the comparing, determining whether the item is at least one of the one or more known items.

In some embodiments, there is provided a method of calibrating an array of pressure sensitive sensors. The method comprising identifying an item disposed on a first area of the array. Identifying the item may comprise determining, using the array, a set of points of contact between the array and a bottom of the item, comparing the set of points of contact to one or more known arrangements in points of contact between one or more known items and the array, and, based on a result of the comparing, identifying the item as one of the one or more known items. The method may further comprise determining one or more expected values for one or more sensors of the first area of the array when the item is disposed on the array. The method may further comprise calibrating the one or more sensors of the first area based at least in part on the one or more expected values.

In some embodiments, there is provided a method of calibrating an array of pressure sensitive sensors. The method comprises detecting, using the array of pressure sensitive sensors, at least one first area of the array on which are disposed one or more items and a second area of the area on which no item is disposed. The method may further comprise detecting one or more values output by one or more sensors of the array in the second area while no item is disposed on the second area, and calibrating the one or more sensors of the array in the second area based at least in part on the one or more values output by the one or more sensors.

In some embodiments, a method is provided for linearizing the force or weight to resistance relationship in an FSR, or introducing an inverse transfer function. Linearization of the force to resistance relationship would enable the addition of anything within the operating range of an FSR between the lower range limit and upper range limit weight value to be added to a running total and produce a result that is proportional to the total weight. Stated differently, and for example only, in a linearized system, if 30 units of weight represents a true 30 units of weight, and 60 units of weight represents a true 60 units of weight, then 30 units of weight added to 60 units of weight will equal 90 units of weight. On the other hand, if 30 true units of weight transforms into 24 measured units of weight and 60 units of true weight transforms into 31 measured units of weight, then adding 24 units of weight to 31 units of weight will produce 55 units of weight instead of 90 because of the distortion introduced, and the distortion increases with each addition to the point where results grow meaningless. Also, looking at the relationship differentially, if the difference between 30 units of weight and 40 units of weight represents 10 units of weight, it may in some embodiments be important that the difference between 120 units of weight and 110 units of weight also represents 10 units of weight. For the above example, an inverse transfer function will transform the 24 measured units of weight back to 30 true units of weight and 31 units of measured weight will transform back to 60 units of true weight.

In some embodiments a mechanical code comprising of a series of bumps is provided. The mechanical code may be present on the bottom of products or objects (where the bottom is a side or sides of an item that contacts a smart shelf or on which the item may rest, which may be an intended bottom given an arrangement of the item or location of the mechanical code or another side), thus producing a mechanical code that can be detected by a smart shelf. Say a soda bottle has a series of bumps upon which the soda bottle can stand. Different configurations of bumps can produce different codes that can be read by the smart shelf to determine what the product is, as to be differentiated from other products that might be placed on the same shelf. For instance, one liter of black cherry soda can be differentiated from one liter of diet orange soda. Given the diameter of a one liter bottle, and given the sensing resolution of a smart shelf, it is possible to configure thousands of differentiable codes, and this can enable the store or establishment to know what products are on the shelf, when and what products are removed from the shelf, and this data can be used for any purpose whatsoever, from inventory control and stock replacement to marketing to security and shrinkage management and awareness. Also, with product segregation, redundant codes can be used throughout the store because it is unlikely though not impossible for contact lens solution to find its way to where soda is sold, and even with similar footprints, misplaced items can be correlated with the likely product weight, thus improving the probability of reliable flags being raised for management.

In some embodiments, the bump pattern of many products on a smart shelf can be read to determine which bumps belong to which product. This may involve reading and quantifying each bump perceived on a smart shelf, and establishing where the center of the bump actually is. All affected bumps above a threshold of force and/or weight may be measured and quantified, and a calculation may be used to determine the center of the application of force is for each bump. This may produce a result that is between pixels, thus resolving the region between adjacent pixels. An object can be placed on a shelf at any angle and position, so it may be helpful to identify the signature of a registration datum, establish the angle of the registration datum relative to the smart shelf, and then normalize or apply a virtual coordinate system for the product once all the bumps associated with that product are identified. Once the normalization process has been performed, the locations and/or angles and/or distances or radiuses between bumps can be quantified for the set of bumps producing a code, and then subsequent comparison to a table or list of templates can be performed and the product identified. When a pattern belonging to one product is isolated and defined as a target pattern, either the target pattern can be transformed into a standardized or normalized coordinate system for comparison or alternatively, a list or alphabet of stored templates can be offset to align over the target pattern and rotated, translated, and/or scaled appropriately until a correlation with a specific template is achieved.

A registration datum may be used in some embodiments to identify a single item without the proximity of other products producing a false signature when bumps of one item are combined with bumps from an adjacent product. Because all a smart shelf may know is where all the bumps are on the smart shelf, in some embodiments unique inter-bump distance and angular relationships may be used to both orient and identify a boundary of an item so a unique code can be extracted.

An FSR pixel may be affected by temperature, temperature history, humidity, humidity history, weight, weight history which can involve the application and removal of weight, the time any location remains weighted, the relaxation that occurs after weight is removed, and the reapplication of weight during any particular time during the relaxation period after weight is removed. Much of this data can come from a priori knowledge of general trends based on quantification of specific formulations of FSRs, and much can come from running records of a histogram of the particular shelf as a function of time. For instance, it can be determined where pixels have no weight applied, and the software can keep track of the changing values for each pixel as a function of time. The weighted values can be normalized with knowledge of a total product's weight. If a pixel had been weighted for a period of time, the weight removed, then more weight applied some time later, the sum of all the newly affected pixels may collectively equal the known weight of a new product placed upon the shelf, and corrections can be made based on the running histories of all the affected pixels.

Figure 1:
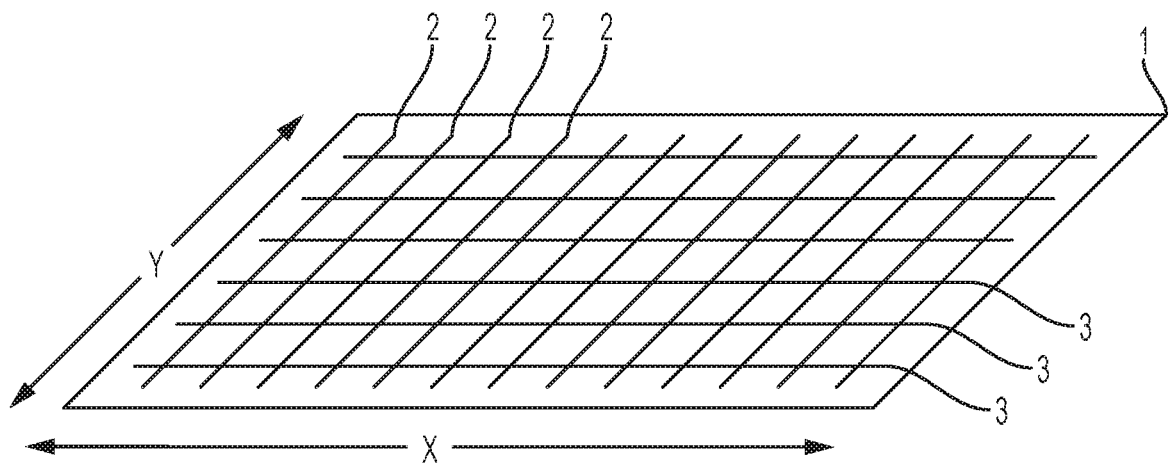
FIG. 1 depicts a schematic representation of a smart shelf with an X-Y sensor grid covering an area.

FIG. 1 depicts a schematic representation of a smart shelf 1 with an X-Y sensor grid covering an area. The X-Y sensor grid comprises a series of representative X traces 3 which are parallel to the X axis and a series of representative Y traces 2 which are parallel to the Y axis.

FIG. 2 depicts a cross-sectional view of an object like a typical bottle or plastic container 10 with two bumps or surface features that apply force to a smart shelf 1. Shown is first bump 11 and second bump 12 which are molded into the typical bottle or plastic container 10, and both bumps are in contact with and pressing into the surface of the smart shelf 1.

Figure 3:
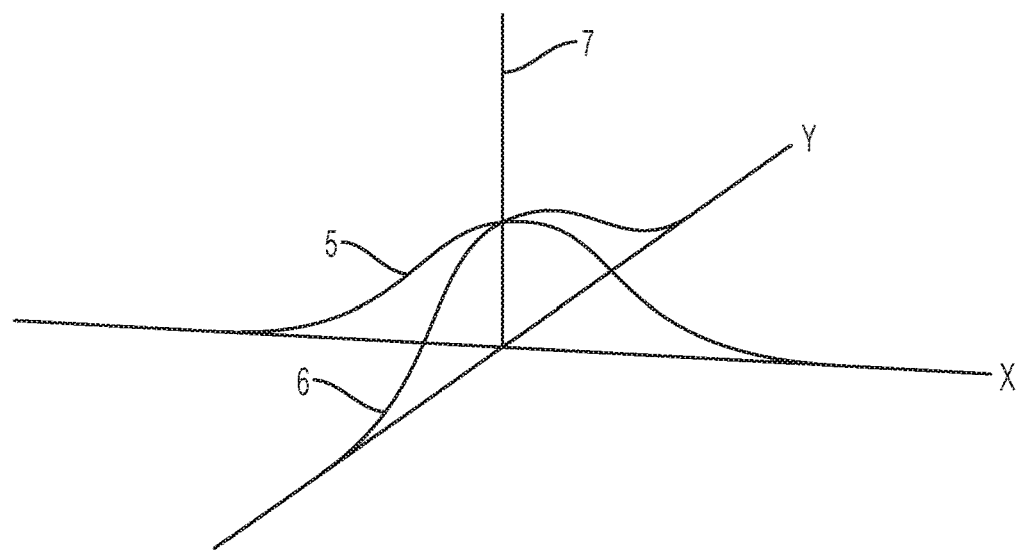
FIG. 3 depicts a continuous function force distribution along an X axis and Y axis.

FIG. 3 depicts a continuous function force distribution along an X axis and Y axis. Shown is the X axis force distribution 5 along the X axis with maximum force applied at the center of bump 7, and the Y axis force distribution 6 along the Y axis with maximum force applied at the center of bump 7. The center of bump 7 is mechanically the first point to contact the surface of plane or smart shelf 1 (of FIG. 1) and therefore compresses the most and generates the most corresponding force. It should be understood that the force distribution is continuous, and produces a continuous function about the center of bump 7 for 360 degrees across the X-Y plane, and that the X axis force distribution 5 along the X axis is a cross-sectional representation, as is the Y axis force distribution 6 along the Y axis, and that these force distributions blend into each other.

FIG. 4 depicts an area matrix wherein each pixel of weight sensing has a value, and there are two clusters of values representing the two bumps depicted in FIG. 2, but generally following the continuous curves depicted in FIG. 3, though quantified due to the pixelization of the area in which the bumps contact. As in FIG. 1, the X-Y sensor grid comprises a series of representative X traces 3 which are parallel to the X axis and a series of representative Y traces 2 which are parallel to the Y axis. For example only, first bump 11 produces force quantification values in the non-zero pixels shown in the first bump zone of influence 11Z and second bump 12 produces force quantification values in the non-zero pixels shown in the second bump zone of influence 12Z. The pixels with zeros within them are shown for example only, and in reality, even with no applied weight creating applied force, these would have non-zero values. Another layer of pre-processing may therefore be used to determine where there is actual weight and where there isn't weight. In some embodiments, running records of history of each pixel may be produced so that a best estimate of the zero force value for each individual FSR is known.

Figures 11, 12:
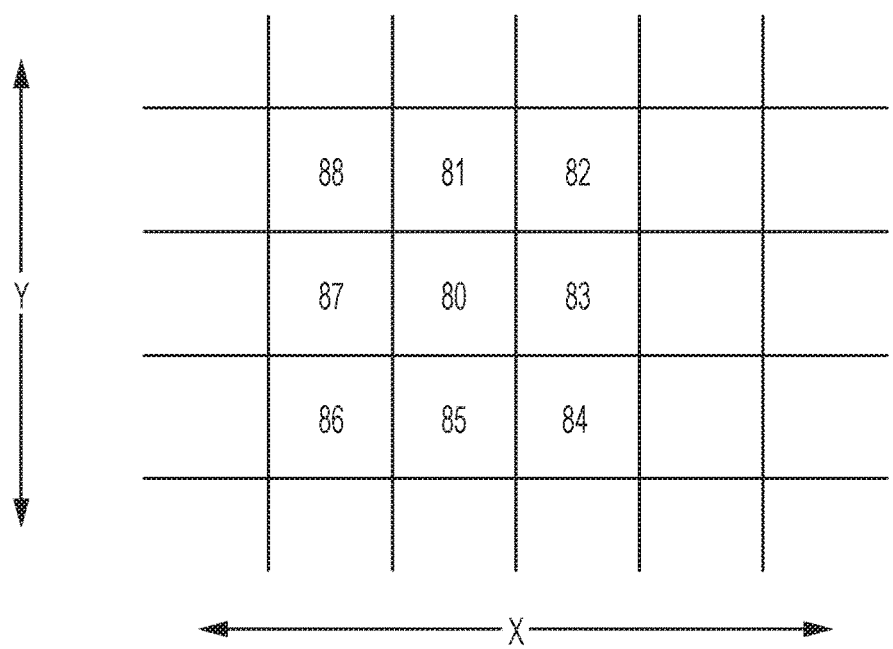
FIG. 11 depicts a pixel drift as might be experienced in time for a force sensing resistor.
FIG. 12 depicts one method for compensating for a bad pixel based on the values of surrounding pixels.
Figure 13A:
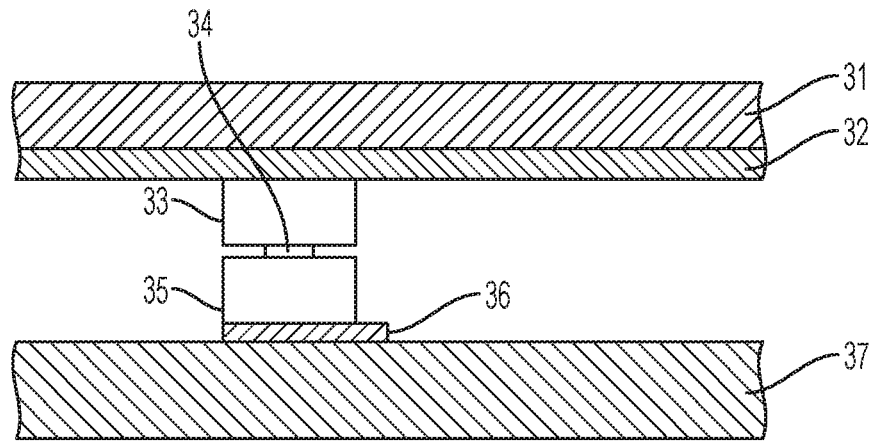
FIG. 13A depicts a cross-sectional view of a single typical force sensing resistor (FSR) within the X-Y matrix of a smart shelf.

For instance, FIG. 11 depicts a pixel drift as might be experienced in time for a force sensing resistor FSR as a function of months of operation. Shown is a twelve month period, and the gradual zero-force creep or drift as a function of at least one of temperature and temperature history, humidity and humidity history, time, chemical changes due to internal chemistry and/or exposure to external chemical environments over any period of time, weight application and history of weight application, acceleration and/or acceleration history, shock and/or shock history including jerk and/or jerk history and all or any combinations in whole or in part of the aforementioned. Organization of FSRs in a matrix to enable quantification of a distribution of weight may be advantageous in some embodiments. FIG. 13A depicts a cross-sectional view of a single typical force sensing resistor (FSR) within the X-Y matrix of a smart shelf 1.

Top substrate 31 is where a product would be placed. There can be other layers for both protection, compression and force averaging ability, and/or for manufacturing convenience. This single substrate layer is shown as an example of this basic component, but it may comprise multiple layers. Attached to top substrate 31 is top X conductor 32, which can also act as a bus for a multiplicity of FSRs. Top FSR 33 is connected electrically and mechanically to top X conductor 32. The attachment and creation of these two components can be though is not limited to a printing operation, with one layer printed upon another. Top X conductor 32 can be printed or deposited on top substrate 31, though there are other methods of connecting top X conductor 32 to top substrate 31. Bottom substrate 37 may be in contact with a planar mechanical surface capable of supporting the weight of products. Attached to bottom substrate 37 is bottom Y conductor 36, which can also act as a bus for a multiplicity of FSRs. Bottom FSR 35 is connected electrically and mechanically to bottom Y conductor 36. The attachment of these two components can be though is not limited to a printing operation, with one layer printed upon another. Bottom Y conductor 36 can be printed or deposited on bottom substrate 37, though there are other methods of connecting bottom Y conductor 36 to bottom substrate 37. A conductor may be a conductive layer either as a single conductor or conductive layer or a conductive subassembly comprising a conductor or conductive layer and a non-conductive coating on top. The conductive layer can also incorporate a Z-axis deposition or film. A conductor can be hot or cold transferred, hot or cold stamped, a foil, sputtered a conductive material, vacuum metalized deposition, or a die cut foil attached with adhesive.

Top X conductor 32 and bottom Y conductor 36 can be reversed, with Y on the top and X on the bottom, and which is a matter of convention and manufacturing choice based on cost, reliability, or convenience. The FSRs not only produce a variable resistance as a function of applied force, but also serve to prevent oxidation of each respective conductive trace and/or prevent chemical exposure to the environment.

Figure 13B:
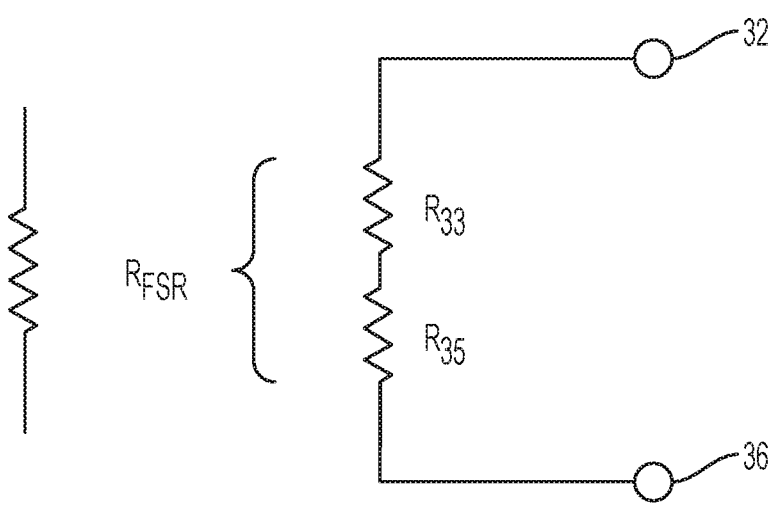
FIG. 13B depicts a electrical schematic equivalent of two FSRs in series.

Top FSR 33 and bottom FSR 35 form top to bottom interface zone 34, where the two come together, and electrical current can flow between both FSRs through the top to bottom interface zone 34. FIG. 13B depicts an electrical schematic equivalent of top FSR 33 in series with bottom FSR 35. The equivalent circuit is formed by the series combination of equivalent resistance of top FSR 33 R33 and equivalent resistance of bottom FSR 35 R35. Together, both these FSRs form total equivalent resistance $R_{FSRtot}$, which is the equivalent resistance between the top X conductor 32 and the bottom Y conductor 36. As force is applied between top substrate 31 and bottom substrate 37, the resistance of $R_{FSRtot}$ decreases. There can also be a number of other layers applied and or printed to top FSR 33 and/or bottom FSR 35. They may be resistive in nature or other FSRs as well, and this could place other layers on both sides of the top to bottom interface zone 34. There can be other components contained and/or interposed in this system including but not limited to diodes, which can be helpful in isolating parasitic current flow and coupling between adjacent matrix points being simultaneously depressed.

Some embodiments may compensate for parasitic current flowing from one cross-point though adjacent bus lines and FSRs back into the first bus, which has the potential to create a parallel circuit between the FSR being sensed and at least three adjacent FSRs in series. This may result because, if the first FSR at a first cross-point is being sensed is being fed by a first vertical bus and a first horizontal bus, a parasitic path may exist between the first horizontal bus and a second FSR at a second cross-point to a second vertical bus to a third FSR at a third cross-point through a third FSR to a second horizontal bus to a fourth FSR at a fourth cross-point and back to the first vertical bus, thus connecting the series combination of the second FSR, the third FSR, and the fourth FSR in parallel with the first FSR. Based on each reading, several equations with an equal number of unknowns can be solved to decouple the parallel parasitic effect.

Figure 10:
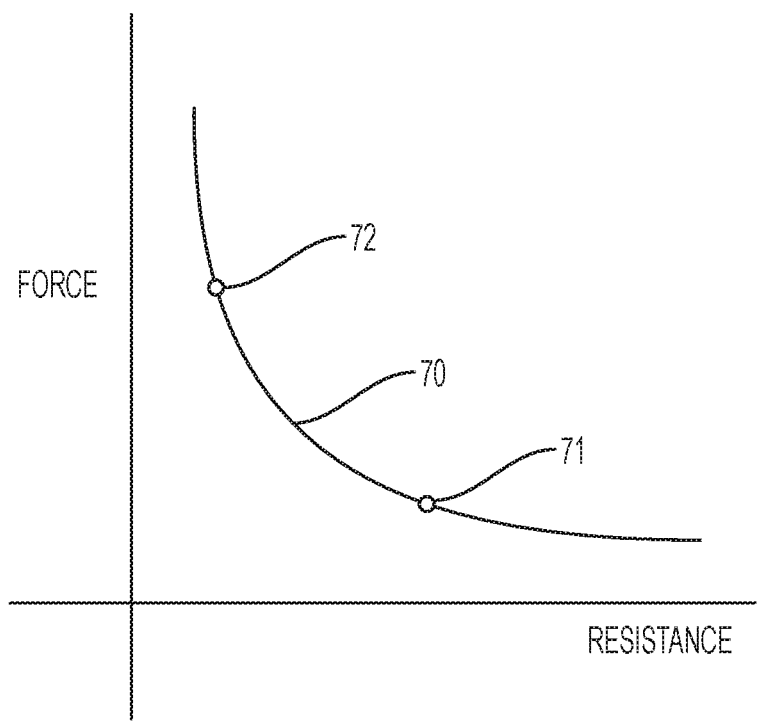
FIG. 10 depicts a general transfer function of resistance vs force for a force sensing resistor.

FIG. 10 depicts a general FSR transfer function 70 showing resistance on the horizontal axis vs force on the vertical axis for a typical force sensing resistor. As can be seen, qualitatively it resembles a hyperbolic function and is non-linear, with an operating range between the no load break point 71 (where no weight and corresponding force is being applied) and the maximum force upper limit 72, beyond which increasing force does not lower resistance enough to quantify accurately. As can be seen, as the force goes up, the resistance goes down. In some embodiments, software running on a controller and/or computer of an inverse transfer function may linearize and calibrate the relationship between resistance measured and force applied.

Figure 5A:
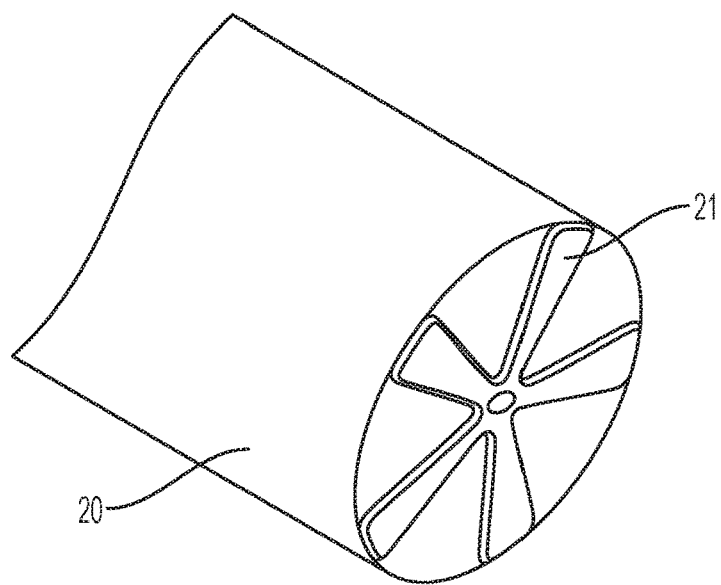
FIG. 5A depicts the bottom portion of a plastic bottle, such as a 1 or 2 liter soda bottle that might be placed on a smart shelf.

FIG. 5A depicts the bottom portion of a plastic bottle 20, such as a 1 or 2 liter soda bottle that might be placed on smart shelf 1. Depicted is a five leg pattern zone and/or petaloid on bottle bottom 21, and it is in this zone that a mechanical bump code would be located, with bumps similar to those depicted in FIG. 2.

Figure 5B:
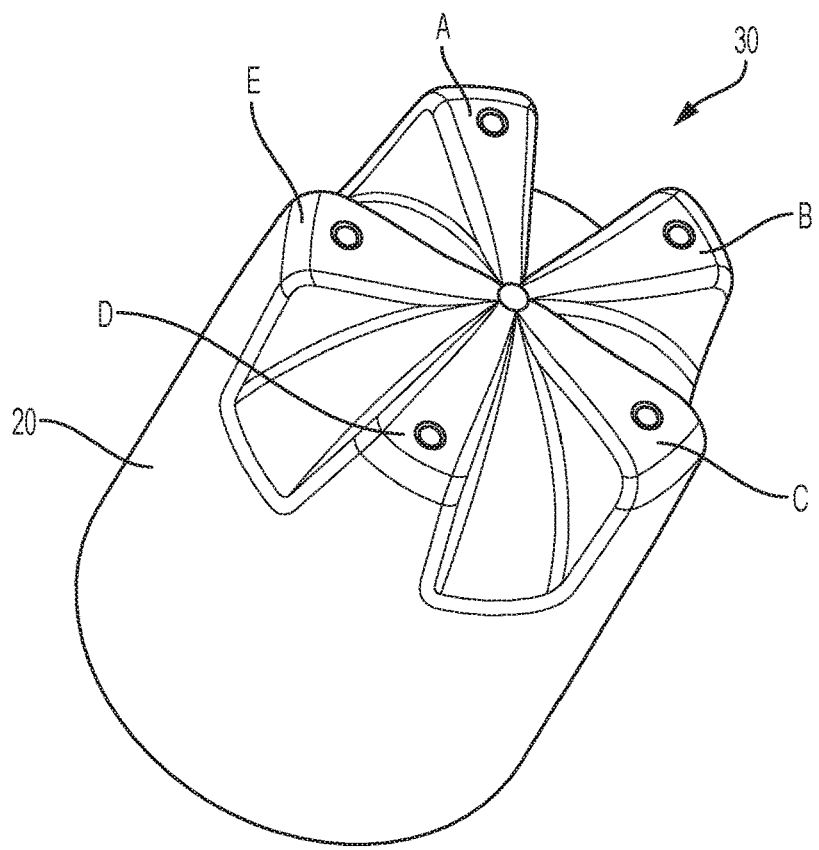
FIG. 5B depicts a rendering of the bottom portion of a plastic bottle, such as a 1 or 2 liter soda bottle that might be placed on a smart shelf.

FIG. 5B depicts a computer rendering of the bottom portion of the plastic bottle 20 of FIG. 5A, such as a 1 or 2 liter soda bottle that might be placed on smart shelf 1. In this rendering, each of the five zones of the five leg pattern zone on bottle bottom 21 is labeled. They are labeled as legs A, B, C, D, and E on a typical bottle bottom 30.

Figure 6:
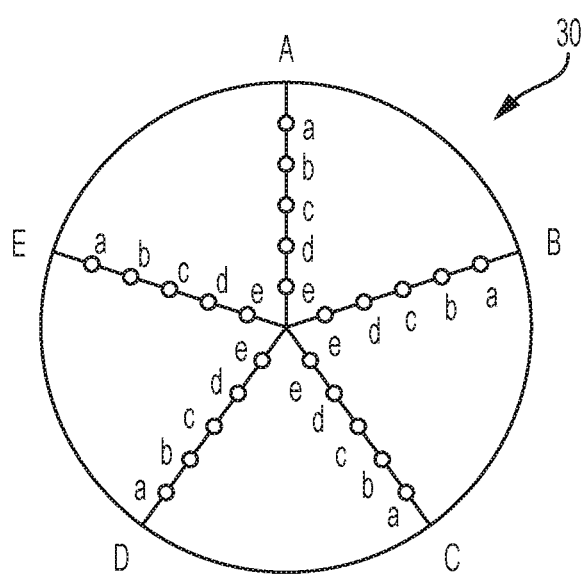
FIG. 6 depicts a schematic representation of the bottom view depicted in FIGS. 5A and 5B, and shown are possible center locations of bumps such as those depicted in FIG. 2.

FIG. 6 depicts a schematic representation of the bottom view depicted in FIGS. 5A and 5B, and shown are possible center locations of bumps such as those depicted in FIG. 2, each bump capable of appearing on each of the five legs, A, B, C, D, and E on a typical bottle bottom 30. On leg A there are five bump locations labeled a, b, c, d, and e. On leg B there are five bump locations labeled a, b, c, d, and e. On leg C there are five bump locations labeled a, b, c, d, and e. On leg D there are five bump locations labeled a, b, c, d, and e. And on leg E there are five bump locations labeled a, b, c, d, and e. Though not shown, it can be imagined that a code comprising five bumps, with one bump on each of the five legs or petaloids could be constructed. For example, Ac (the cth position on the Ath row), Be, Ca, Dd could be the bumps comprising a particular pattern. In this scenario, with five bumps, there are $5^5$ number of codes, or 3125 number of codes. In reality, all these codes can't be configured to produce an unstable mechanical arrangement conducive to tipping the bottle, if, say, all the bumps were located in too many adjacent e positions. This infers that there are fewer practical codes than the maximum number of possibilities. If there are two bumps per leg, there would be 10 bumps in a complete code. This raises the number of possibilities. In the A leg there are the following set of possibilities: Aa and Ab, Aa and Ac, Aa and Ad, Aa and Ae, Ab and Ac, Ab and Ad, Ab and Ae, Ac and Ad, Ac and Ae, Ad and Ae, thus producing ten possible combinations on each leg, and for five legs this produces 100,000 possible combinations. If there is a requirement that at least one bump be at the c, b, or a positions to maintain stability, then this produces $9^5$ possible combinations, or 59,049 possibilities.

In some embodiments, there may be fewer combinations because in these cases, it may be desirable that there be an unambiguous method of determining which bumps belong to one bottle and which bumps belong to another. The smart shelf may only see bumps in many locations, and an analysis may determine the center location of each bump and the distance between all bumps within the maximum distance that the farthest bump can be and still be within a coded pattern. This distance may be between alternating legs at the a-bump position, or the distance between Aa and Ca or Aa and Da, or any leg and a non-adjacent leg in the a position.

Figure 14A:
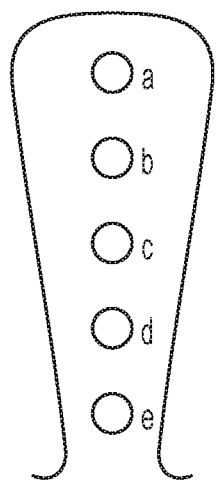
FIG. 14A depicts a linear pattern of bumps.
Figure 14B:
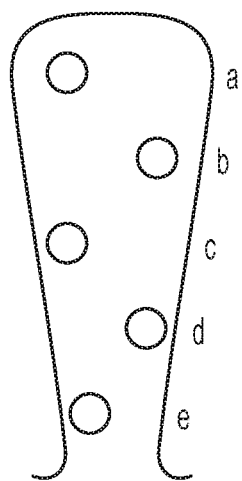
FIG. 14B depicts a staggered pattern of bumps.

FIG. 14A depicts a linear pattern of bumps a, b, c, d, and e which could be located on any of the A, B, C, D, or E lines. FIG. 14B depicts a staggered pattern of bumps a, b, c, d, and e which could be located on any of the A, B, C, D, or E lines. There are many patterns that can be employed for both code creation and for datum establishing and location of a pattern origin.

Figure 7:
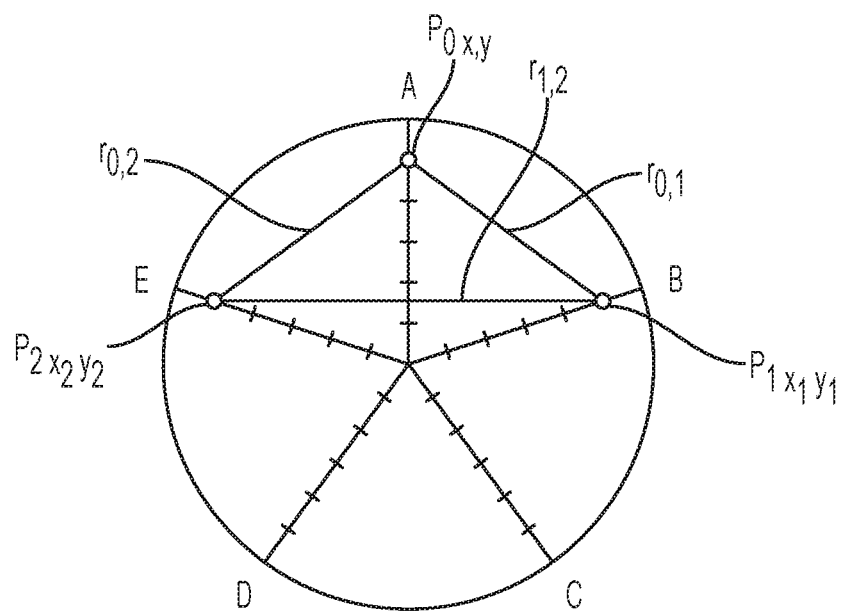
FIG. 7 depicts illustrative features that may be used to orient and help identify a bump pattern belonging to a single bottle.

FIG. 7 depicts features that could be used to orient and help identify a bump pattern belonging to a single bottle. Let's assume that a reserved code is created to orient the pattern and create a datum from which the bump locations can be identified. Hypothetically, on the A leg outermost point "a" could be $P_0 x,y$. On the B leg outermost point "a" could be $P_1 x_1, y_1$. On the E leg outermost point "a" could be $P_2 x_2, y_2$. $r_{0,1}$ is the distance between $P_0 x,y$ and $P_1 x_1, y_1$. $r_{0,2}$ is the distance between $P_0 x,y$ and $P_2 x_2, y_2$. $r_{0,1}$ and $r_{0,2}$ are the same distance. If the geometry is such that there is only one solution to this, then the center point of the pattern $P_0 x,y$ can be established. Further confirmation can be made, though redundant, between points $P_1 x_1, y_1$ and $P_2 x_2, y_2$ and this distance is $r_{1,2}$. For this to work however, there can be no other adjacent "a" radius points to produce a false datum for the A leg, thus, Aa and Ba and Ca is an illegal combination, Ba and Ca and Da is an illegal combination, Ca and Da and Ea is an illegal combination, and Da and Ea and Aa is an illegal combination. Only Ea and Aa and Ba is a legal combination to uniquely identify Aa as the origin of the pattern.

Returning to FIG. 6, if the distance is known between all distances between any two points that can exist, then in some embodiments the pattern may be uniquely identified. So the following distances are known: Aa to Ba, Aa to Bb, Aa to Bc, Aa to Bd, and Aa to Be, and likewise, the distances between Aa to Ea, Aa to Eb, Aa to Ec, Aa to Ed, and Aa to Ee, then ⅗ths of all possible patterns can be determined. Because the angle is steep between the A line and the C line and the D line, known distances between the B line and the C line can be used, and known distances between the E line and the D line can be used to complete the pattern acquisition.

Figure 8:
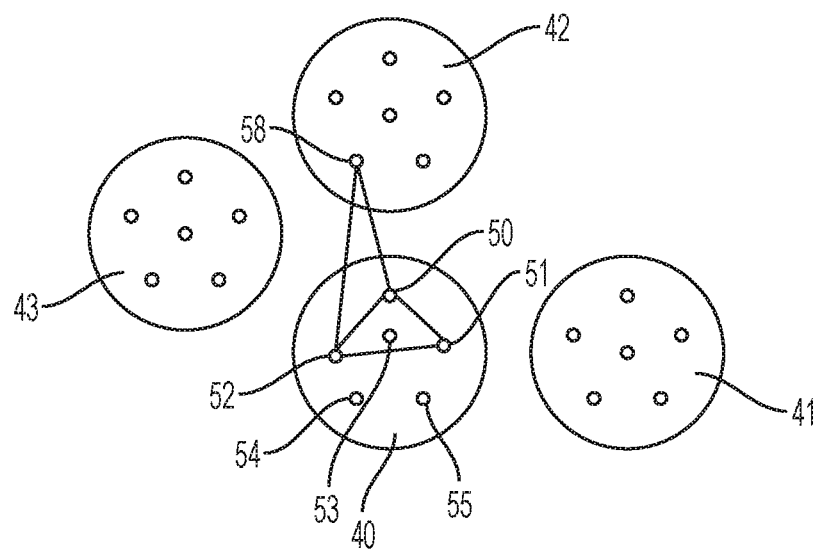
FIG. 8 depicts the placement of several bottles on a smart shelf, showing how the proximity of one bottle to another can create two possible bottle placement solutions, which may be address in embodiments using an analysis to determine which bumps belong to which bottle.

FIG. 8 depicts the placement of several bottles on a smart shelf, showing how the proximity of one bottle to another can create two possible bottle placement solutions, which may be resolved in some embodiments using analysis to determine which bumps belong to which bottles so the correct code can be ascertained. Shown are the outlines of four bottles, first bottle 40, which is the bottle of interest, a second bottle 41, a third bottle 42 in which bump Ea 58 will be confused with acquisition of the pattern on first bottle 40. All bottles are identical, but each cluster may first be identified. In determining the distance between all points and all other points, it is found that the distance between datum origin Aa 50 and Ba 51 is the same as the distance between datum origin Aa 50 and Ea 52, which is also the same as the distance between datum origin Aa 50 and Ea 58 on third bottle 42. So the question is: which is the correct triangle, the one formed with bumps datum origin Aa 50 and Ba 51 and Ea 52, or the triangle formed by datum origin Aa 50 and Ea 52 and Ea 58? In both cases, datum origin Aa 50 will be the apex of the triangle from which distances will be measured, and only first bump on A leg 53, second bump 54, and third bump 55 will fall within the correct angle and distance range to be potential solutions. As mentioned earlier, there may be hundreds of possible codes in some embodiments, and valid codes can be identified, which can then be compared to the products that should be in the location being scanned for product, and it will then become apparent that a black cherry soda is where the diet orange soda should be, and flags are set for management to reorganize the merchandise.

Figure 9:
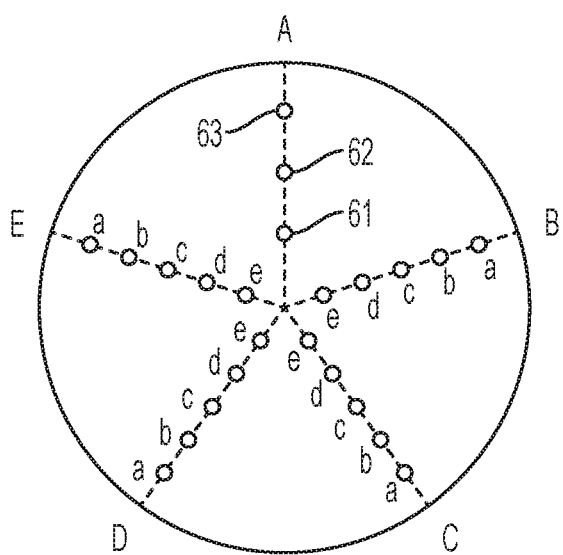
FIG. 9 depicts a different set of features that may be used to orient a bottle, which may be used in some embodiments to identify a registration datum and thus the direction of the center of the code pattern and distances to other coded bumps.

FIG. 9 depicts a different set of features that may be used in some embodiments to orient a bottle. With this set of features, in these embodiments, it may be possible to unambiguously identify a registration datum and thus the direction and location of either the virtual center of the code pattern or some other pattern origin which may or may not be centered over a bump, and then the distances and corresponding angles to other coded bumps can be confirmed and a corresponding code established. It should be noted that there are many possible centers that can be used for the purpose of decoding the bumps. In this example, first datum bump 61, second datum bump 62, and third datum bump 63 are all located on the A line, which is the datum line. As shown, the distance between first datum bump 61 and second datum bump 62 is a different and unique distance than the distance between any two adjacent bumps in the B line, C line, D line, or E line. And further, the distance between second datum bump 62 and third datum bump 63 is both greater than the distance between first datum bump 61 and second datum bump 62 and a different and unique distance than the distance between any two adjacent bumps in the B line, C line, D line, or E line. It can therefore be establish that these three datum points lie in the same line and the different distances can establish in which direction the center of the pattern resides.

An equation of the best fit of the line passing through all three points can be determined, and subsequent angles and distances can be established between a map or template overlayed and/or superimposed over the pattern of bumps within a single pattern, and thus locations correlated to code locations, and the code can be extracted.

One scenario could be to establish a best fit to define where Ba, Bb, Bc, Bd, and Be resides relative to first datum bump 61, second datum bump 62, and third datum bump 63. And likewise, a best fit to define where Ea, Eb, Ec, Ed, and Ee resides relative to first datum bump 61, second datum bump 62, and third datum bump 63. This can also be extended to establish a best fit to define where Ca, Cb, Cc, Cd, and Ce resides relative to first datum bump 61, second datum bump 62, and third datum bump 63 as well as where Da, Db, Dc, Dd, and De resides relative to first datum bump 61, second datum bump 62, and third datum bump 63.

Because the angles grow more shallow between the A line and the C and D lines, another scenario for accurately establishing where any positioned bump is on the C and D lines is to use one or more bumps on the B line and E line as a reference or sub datum from which to make subsequent distance and angle measurements. For instance, and for example only, suppose it has been established that Bb was a properly decoded bump on the B line and Ea and Ed were properly decoded bumps on the E line. A map of angles and distances can be stored between Bb and where Ca, Cb, Cc, Cd, and Ce resides, and a map of angles between Ea and where Da, Db, Dc, Dd, and De resides and where Ed and where Da, Db, Dc, Dd, and De resides. Everything can be cross checked against everything else till a proper code can be extracted from a single product on a shelf. This two step datum and derived sub datum may be implemented in some embodiments.

A best fit may be advantageous because not all identical bottles will have coded bumps in exactly the same locations, and even in embodiments in which certain locations for bumps are prescribed, there may be natural drift between products/vendors or due to manufacturing variation from the locations of where bumps should be. In some embodiments, distances can be established between a theoretical and actual location, and if the bump falls within a certain tolerance this may be considered a coded bump location. If a bump falls within a distance or radius that is less than half the distance between any two adjacent bumps, it can be considered a properly decoded bump. The process may be complicated by bad pixels and dropped out codes, but error correction may be employable.

For instance, FIG. 12 depicts one method for compensating for a non-registering bad pixel based on the values of surrounding pixels. This would be the case if a weight or product coding bump were placed on a smart shelf and one pixel did not register the presence of weight but the surrounding pixels did. Shown is bad pixel 80, surrounded by the eight good pixels: north pixel 81, northeast pixel 82, east pixel 83, southeast pixel 84, south pixel 85, southwest pixel 86, west pixel 87, and northwest pixel 88. One way to derive a number for bad pixel 80 is to add the normalized numerical values of the surrounding pixels:

bad pixel 80=(north pixel 81+northeast pixel 82+east pixel 83+southeast pixel 84+south pixel 85+southwest pixel 86+west pixel 87+northwest pixel 88)/8.

This is not the only way to solve this, and this particular method should not exclude other methods and/or algorithms from determining the value of a bad pixel.

A mechanically produced code, pattern of bumps or surface features, or product outline can be sensed by a smart shelf. FSRs will decrease their resistance as weight increases. With no weight applied, an FSR will have some maximum resistance. As weight is applied, the resistance will drop, usually in a non-linear manner, until a maximum force level produces a minimum resistance. Further addition of weight or force beyond this maximum produces little or no decrease in resistance, and therefore it is desirable to remain within the operating range of the FSR. The relationship between resistance and force is approximately a hyperbolic function as mentioned, but an FSR may benefit from calibration so there is a known relationship between applied force and the resulting resistance. Resistance can be measured in any number of ways. An FSR can be incorporated within a voltage divider circuit, or a current changing circuit. A constant current can be made to flow through an FSR, thus producing a voltage proportional to resistance. There are many methods employable to measure resistance to produce a voltage or current that can be quantified with an A/D converter.

Referring again to FIG. 2, first bump 11 and second bump 12 might produce respective patterns first bump zone of influence 11Z and second bump zone of influence 12Z as depicted in FIG. 4. Each bump produces a cluster of FSR pixels upon which weight is applied. In patterns such as those depicted in FIG. 8, there are six bumps carrying the weight of each respective bottle. Some dimples or bumps will carry more of the weight than others due to irregularities and the fact that more than three points of contact with a plane creates a statically indeterminate load distribution. Anyone who has ever sat on a four-legged chair on an irregular surface knows this; you can rock back and forth between the two shortest legs, rocking about the two longer legs which form a fulcrum. Three legs are always stable, however, and the weight naturally distributes amongst the three legs. In a situation with four or more points of contact, the weight will distribute depending upon the heights of the bumps and their inherent compressibility against the surface upon which the object is placed. If the shape of a bump is rounded, there will be a tendency to compress at the outermost tip, and distribute as the radius increases from the zone of first contact and corresponding maximum compression. Compression is more guaranteed because the pressure is greater when force is applied to a smaller area, as in the region at and surrounding the tip (of contact), and the less rigid the bottle and the shelf surface, the greater will be the mating of at least some portion of all of the bumps producing a total code on the bottom of a bottle. Some bumps will register over a larger number of pixels than others, and some pixel clusters registering the locus of a single bump will register more integrated force than the locus of other bumps. In any pixel cluster, the weight will distribute, and the force per pixel can be added such that a total force in that cluster can be determined. This can produce several useful data. One is the total weight applied to a cluster. This is the same as standing on several scales at the same time. If a 100 pound person places one leg on one scale and another leg on another scale, the sum of the weights of both scales will be 100 pounds. If this person leans more to one side, thus applying more weight on one scale, the distribution may be 60 pounds on one scale and 40 on the other, but the sum is still 100 pounds. If the weight is distributed unevenly amongst six scales, the sum of the weights will still be 100 pounds. If many clusters of scales are depressed where a single cluster represents the distribution of force beneath a single bump, then the sum of all the scales in all the clusters beneath all the bumps will equal the total weight of the product, and this information can be used for calibration as well, and this is part of some embodiments. While FSRs may drift and change values over time due to temperature, humidity, weight, and the sum of the histories of all these environmental variables, the weight of a known product will always serve as an accurate calibration source. For a bottle or product placed upon a smart shelf the following relationship applies:

$$Wt = \sum_{1}^{n} TiKiVi$$

where i=index with values from 1 to n
n=the total number of weight bearing pixels the summation is occurring over
$W_t$=the total weight of a container, product, or bottle
Ti=inverse transfer function of the ith pixel, force/voltage
Vi=the voltage measured in the ith pixel
Ki=calibration coefficient for the ith pixel If current is used rather than voltage, Vi would be current. This is the number the above mentioned A/D converter would produce. The calibration coefficient Ki is an experimentally determined value. This number may change for each respective pixel as the value produced by each pixel changes, with knowledge that it may be helpful for a best fit of all the affected pixels to produce a total weight that equals the known weight of the product.

A mass center of the bump producing a signature within a pixel cluster can be determined. In some embodiments, it may be helpful to know where the bump is in relation to other bumps. In some cases, the greater resolution this can be determined, the greater the number of codes that can be produced. It is possible to determine a position center that is between pixels. In the following example, only one dimension is considered, but the same technique can be used in two (or more, mathematically) dimensions.

For instance, assume weight to be distributed along one axis amongst adjacent pixels in the following way:

Pixel 1=0
Pixel 2=5
Pixel 3=15
Pixel 4=11
Pixel 5=6
Pixel 6=1
Pixel 7=0

The affected or productive five pixels are 2, 3, 4, 5 and 6, with corresponding normalized numerical values 5, 15, 11, 6, and 1, which adds up to 38, which is proportional to the total weight applied collectively. Splitting the difference, 19 units of weight are distributed on one side of the arithmetic center Ac (not to be confused with the aforementioned cth position of the Ath leg) in the direction of lower numbered pixels, and 19 units of weight are distributed on the other side of the arithmetic center Ac in the direction of higher numbered pixels.

If the pixels are ⅒ of an inch or 0.100 inches wide, then the center of a pixel is located 0.050" from the edge of its boundary, and thus the center of pixel 2 is 0.400" from the center of pixel 6. If one assumes the weight within each pixel to be concentrated in the center of the pixel, then 5 units of weight are centered about pixel 2 and 15 units of weight are centered about pixel 3. The sum of pixels 2 and 3 are 20 units of weight, and 19/20ths of this weight is located between the center of pixel 2 and 0.095" from the center of pixel 2 towards the center of pixel 3, or 0.005 inches off the center of pixel 3 in the direction of pixel 2. This could be considered the arithmetic center Ac of the cluster of pixels, with half the weight located on one side of Ac and half the weight on the other side.

Another method for establishing the center of pressure is to convert the system into a torque model, where there is a force applied at the center of a pixel and a radius from an arbitrary center B, to be determined. In this model, a distance d can be defined as the distance between that arbitrary center B and the center of pixel 2, and the complimentary distance d−0.4, which is the distance between B and the center of pixel 6. In this model, assuming for expediency that the center lies between pixel 3 and 4, a torque balance is set up where the sum of the torques on the left is set equal to the sum of the torques on the right in order to solve for the unknown distance d. In this model:

pixel 2 produces a torque of 5d to the left, or counter clockwise
pixel 3 produces a torque of 15(d−0.1) to the left, or counter clockwise
pixel 4 produces a torque of 11(0.4−d−0.2), or 11(0.2−d) to the right, or clockwise
pixel 5 produces a torque of 6(0.4−d−0.1), or 6(0.3−d) to the right, or clockwise
pixel 6 produces a torque of 1(0.4−d). or (0.4−d) to the right, or clockwise
which produces:

$$5d+15(d-0.1)=11(0.2-d)+6(0.3-d)+(0.4-d)$$

reducing to

38d=5.9, and d=0.155263158 to the right of the center of pixel 2, or 0.055263158 to the right of the center of pixel 3.

Establishing the center in the second dimension, while more complicated, can be found by finding the center for each corresponding row and each corresponding column to establish a first pass location to use as a starting point for establishing a center. In an iterative fashion, these centers can be used to locate a two dimensional center with two variables, r and θ, where if vertical up is taken as 0 degrees, vertical down is taken as 180 degrees, horizontal right is taken as 90 degrees, and horizontal left is taken as 270 degrees, then the center of each pixel can be established from an arbitrarily defined center, with both horizontal and vertical constraints being satisfied.

If the unknown center location is Cx,y, and pixel Px,y is the pixel being evaluated, then the distance Cx−Px=Δx and Cy−Py=Δy.

If Wpi=the pixel weight unit of the ith pixel, then the contributing torque produced by that pixel is (Wpi) Δxi in the x direction and (Wpi) Δyi in the y direction. By summing over all the pixels in both x and y, the true center of balance can be found. Another way of looking at this is: if on a weightless checker board, a cluster of squares were to have varying weights placed, where would the spot be such that the board could be supported and balance perfectly, thus locating the center in both x and y. This calculation can be made and work equally well in rectangular or polar coordinates.

Given any cluster of pixels, the x axis center line can be found by solving the following equation:

$$0 = \sum_{1}^{n} \Delta xi \, Wpi$$

where Δxi is the distance between the x component of the center location, Cx, and the application of weight at the ith pixel. Thus, Δxi=Cx−dxi, where dxi is the x component of absolute position of the ith pixel, which is known. The only unknown is Cx.

This becomes $$0 = \sum_{1}^{n} (Cx - dxi) \, Wpi$$

Solving for this yields a unique value for Cx.

And likewise, the y axis center line can be found by solving the following equation:

$$0 = \sum_{1}^{n} \Delta yi \, Wpi$$

where Δyi is the radius or distance between the y component of the center location, Cy, and the application of weight at the ith pixel. Thus, Δyi=Cy−dyi, where dyi is the y component of absolute position of the ith pixel, which is known. The only unknown is Cy.

This becomes $$0 = \sum_{1}^{n} (Cy - dyi) Wpi$$

Solving for this yields a unique value for Cy.
And thus, the single coordinate pair is Cx,y, is the moment center of a cluster of n pixels.

In one embodiment, there may be provided a code extraction and product identification process for a product placed upon a smart shelf comprising the following steps: acquiring weights and locations on the area matrix comprising the steps: scanning the area matrix, acquiring and quantifying a raw value of each pixel located within the area matrix, normalization of the raw value of each pixel to produce a normalized force applied to each pixel comprising at least one of: applying offsets based on a running record of drift and/or pixel history of each pixel, linearization by application of FSR inverse transfer function to each pixel, application of at least one known and/or experimentally determined constant and/or scale factor, defining the cluster set of pixels belonging to at least one bump or each bump, identifying at least one bad pixel and/or calculating at least one normalized value based on the normalized values of at least one surrounding pixel contained within the cluster set, calculating the bump center of each bump and storing on at least one matrix list, isolating the bump center set contained within the matrix list, the bump center set forming a single product code contained on a single product or item comprising at least one of the following: establishing a code datum axis and/or code datum origin, isolating a single product pattern or code involving self-non-self determination, pattern orientation normalization involving pattern rotation and/or positional offset, extracting an occupied state set by comparison of each respective bump center to a template of permissible positions that bumps may or may not be located within to determine whether a bump center is or isn't in a permissible position, error correction applied to at least one bump center, transforming the occupied state set into a unique product code, comparing the unique product code to a table of unique product codes to determine which product the unique product code represents, performing at least one maintenance operation comprising at least one of: establishing and/or updating offsets for each pixel, establishing and/or updating a zero force value of a pixel representing no force application, update at least one linearization transfer function and/or inverse transfer function, flagging at least one bad pixel and adding to a bad pixel list.

Embodiments may further comprise a multistep process of establishing the distances and angles from at least one first datum to at least one first set of coded bumps, and using at least one second bump from said at least one first set of coded bumps as at least one secondary datum to establish the location of at least one third set of coded bumps.

Embodiments may further comprise the acquisition of the outline of a package by correlating at least one acquired pattern with at least one template stored in a memory.

Defining the cluster set of pixels belonging to each bump can involve the comparison to a running tabulation of the threshold zero force value corresponding to at least one pixel or each respective pixel, below which the pixel can be rejected as not having force applied and does not belong to at least one cluster set of pixels corresponding to a bump, and above the threshold zero force value corresponding to at least one pixel, the pixel can be accepted and incorporated within the cluster set of pixels belonging to at least one bump.

The known weight of a product can be used for the calibration of a smart shelf.

Embodiments may further comprise the ability to determine the angle of a smart shelf off the horizontal based on the distribution and/or statistical distribution and/or statistical distribution over time of weight of a product on the smart shelf. This can be determined by determining a distribution over the shelf or a portion of the shelf more weight being detected on one side of a product than another, which is what would happen if a shelf were beginning to sag. This could trigger an alert to store management to correct the problem.

Calculating the bump center can comprise at least one of the following methods: assigning a first guess center comprising an x coordinate and a y coordinate located within the area of the cluster set of pixels, defined herein as Cx,y, establishing the x moment about the Y axis passing through Cx, y by equating all torques to the left of the Cx, y to all torques to the right and locating the balance about the Y axis, wherein a component of torque for a single pixel is the normalized force multiplied by the distance between its respective pixel center to Cx, y and establishing the y moment about the X axis passing through Cx, y by equating all torques above Cx, y to all torques below and locating the balance about the X axis, wherein a component of torque for a single pixel is the normalized force multiplied by the distance between its respective pixel center to Cx, y. The above steps can be repeated as many times as is necessary to equate the sum of horizontal pixel torques to the left of the y component of center to the sum of horizontal torques to the right of the y component of center and to equate the sum of vertical pixel torques above the x component of center to the sum of vertical pixel torques below said x component of center. Another method is to sum all normalized forces for all pixels contained within the cluster set of pixels and locating a y axis such that half the weight is to the left and half the weight is to the right, and locating an x axis such that half the weight is above and half the weight is below.

The FSR inverse transfer function can be a transfer function that, when multiplied by the raw value of each pixel produces a linear or near linear relationship between force or weight and the number representing the force or weight over a continuous operating range of the FSR.

The code datum axis and/or code datum origin can be found by establishing a two coordinate area center of a first registration bump and a two coordinate area center of a second registration bump that is an a priori known distance within a tolerance from the two coordinate area center of a first registration bump, and using the distance between the two to establish an angle to a reference grid and/or a reference datum.

Extracting an occupied state set can involve matching between at least one template and at least one set of bump centers, distances between at least two bump centers, and angles between at least one line (passing between at least one bump center and at least one other bump center) and at least one datum or axis, and that the matching involves at least one of at least one translation, at least one rotation, and/or at least one scaling of either at least one template and/or occupied state set.

Extracting an occupied state set can involve the process of establishing what belongs to code and what does not belong to a code.

Embodiments may further comprise the establishment of a first center of a single pattern and/or a reference datum and/or a reference point from which the location of at least one other bump can be found relative to the location of at least one other bump being defined in rectilinear coordinates comprising of a vertical coordinate and a horizontal coordinate and/or in polar coordinates comprising a radius or distance and an angle relative to at least one vertical axis and/or a horizontal axis and/or datum. The radius or distance can be the distance between the reference point and at least one other bump and the angle can be the angle formed between the line passing between the reference point and at least one other bump and a vertical axis and/or a horizontal axis and/or datum and/or the establishment of at least one second center of a single pattern and/or a reference datum and/or a reference point from which the location of at least one other bump can be found relative to.

The bump center set can be found by implementing a two step process whereby at least one first step is the establishment of at least one first set of bump centers based on at least one datum, and at least one second step is the establishment of at least one second set of bump centers based on the positions of the at least one first set of bump centers, and at least one first set of bump centers and at least one first second of bump centers can be contained within the bump center set, with the bump center set being used to extract the unique product code.

At least one first set of bump centers can be found by identifying at least one set of points along an orientation axis datum, and then identifying at least one first set of bump centers based on at least one first angle and at least one first radius from at least one set of points along an orientation axis datum, and then identify at least one second set of bump centers based upon at least one second angle and at least one second radius from at least one first set of bump centers.

Embodiments may further comprise the determination of the outline of a package by correlating the acquired pattern with at least one template stored in a memory Embodiments may further comprise at least one of pattern recognition software, face recognition software, one and/or two dimensional discrete Fourier transforms, one and/or two dimensional fast Fourier transforms, one and/or two dimensional convolution integrals, at least one and/or two dimensional sliding window filters, support vector machine, random forest, look up tables, Naive Bayes classifier, logistic regression, and at least one other machine learning algorithm, open source code, proprietary recognition software packages, other commercially available software packages, any of which, in whole or in part, can be customized for product recognition on a smart shelf.

Some embodiments may relate to a mechanical code imparted or existing on a product, item, SKU, plastic or glass bottle, container, package or other means of containing a weight bearing material.

Embodiments may further comprise error correction to facilitate product identification in the event of only a partial code being extractable from a subset of at least one set of bumps. Error correction may detract from the number of possible codes that can be imparted to the bottom of a container, but the reliability of product identification can increase tremendously. In the real world, products are dropped, and the bottom of a container may be damaged, but it may still be possible to identify a product from a partial code and/or a code possessing error correction.

Embodiments may further comprise the ability to orient a product on a smart shelf based on at least one set of bumps on a product or container.

In some embodiments, there is provided a mechanical code comprising of at least one set of bumps present on the bottom of a product and/or item, and at least one set of bumps can be composed of at least three individual bumps, with each constituent individual bump contained within at least one set of bumps, and each constituent individual bump can be located at one of a number of possible different pre-determined locations, and the position of each respective bump at each respective location taken together form a multiplicity of possible combinations, thus producing the mechanical code.

Embodiments may further comprise a unique signature comprised of a unique relationship between at least three bumps to establish a registration datum, and the unique relationship can comprise at least two distances and at least two angles, and at least two distances can be a first distance between a first bump center and a second bump center and a second distance between a first bump center and a third bump center and at least two angles can be a first angle formed between an X axis or a Y axis or a datum axis and the line passing through the first bump and the second bump, and a second angle can be formed between an X axis or a Y axis or a datum axis and the line passing through the first bump and the third bump.

At least one set of bumps can be a multiplicity of bumps that forms a code on a single item that can be at least one of a product, item, box, SKU, a bottle made of any substance, a container.

In some embodiments, there is provided a force sensing matrix comprising of: at least one top non-conductive substrate, at least one bottom non-conductive substrate, at least one top conductor connected and/or attached to at least one top non-conductive substrate, at least one bottom conductor connected and/or attached to at least one bottom non-conductive substrate, at least one top FSR connected electrically and mechanically to at least one top conductor, at least one bottom FSR connected electrically and mechanically to at least one bottom conductor. At least one top FSR can be in electrical contact with at least one bottom FSR such that current can flow between at least one top conductor and at least one bottom conductor through the series path created by at least one top FSR and at least one bottom FSR. At least one top conductor can be at least one drive line and at least one bottom conductor can be at least one sense line or at least one bottom conductor can be at least one drive line and at least one top conductor can be at least one sense line.

The resistance of at least one top conductor and the resistance of at least one bottom conductor can be compensated for and/or decoupled from the collective resistance of at least one top FSR and at least one bottom FSR.

Embodiments may further comprise at least one diode or printed diode comprising of at least one first printed layer of P or N material and at least one second printed layer of N or P material in series with at least one FSR, and the location of at least one diode or printed diode can be at least one of: interposed between at least one top conductor and at least one top FSR, interposed between at least one bottom conductor and at least one bottom FSR, interposed between at least one top FSR and at least one bottom FSR.

At least one top FSR and at least one bottom FSR can form a multiplicity of FSRs and/or pixels covering the area of the force sensing matrix, and the multiplicity of FSRs and/or pixels can be equal to the number of top conductors lines multiplied by the number of bottom conductor lines.

Embodiments may further comprise a computer memory to keep and maintain a running record of bad FSRs and/or pixels.

In some embodiments, there is provided a force sensing matrix comprising of at least one top non-conductive substrate at least one bottom non-conductive substrate, at least one top conductor connected and/or attached to at least one top non-conductive substrate, at least one bottom conductor connected and/or attached to at least one bottom non-conductive substrate, with at least one top FSR connected electrically and mechanically to at least one top conductor and in series with at least one top Z-axis coating and/or at least one top Z-axis coating connected electrically and mechanically to at least one top conductor and in series with at least one top FSR, at least one bottom FSR connected electrically and mechanically to at least one bottom conductor and in series with at least one bottom Z-axis coating and/or at least one bottom Z-axis coating connected electrically and mechanically to at least one bottom conductor and in series with at least one bottom FSR, and at least one top FSR or at least one top Z-axis coating is in electrical contact with at least one bottom FSR or at least one bottom Z-axis coating such that current can flow between at least one top conductor and at least one bottom conductor through the series path created by at least one top FSR or at least one top FSR and at least one top Z-axis coating and at least one bottom FSR or at least one bottom FSR and at least one bottom Z-axis coating, and at least one top conductor is at least one drive line and at least one bottom conductor is at least one sense line or at least one bottom conductor is at least one drive line and at least one top conductor is at least one sense line.

In some embodiments, there is provided a force sensing matrix comprising of at least one top non-conductive substrate at least one bottom non-conductive substrate at least one top conductor connected and/or attached to at least one top non-conductive substrate, at least one bottom conductor connected and/or attached to at least one bottom non-conductive substrate, at least one top FSR with at least one top resistance vs. force characteristic connected electrically and mechanically to at least one top conductor, at least one bottom FSR with at least one bottom resistance vs. force characteristic connected electrically and mechanically to at least one bottom conductor, and at least one of the following: at least one first FSR with at least one first resistance vs. force characteristic in series with at least one second FSR with at least second resistance vs. force characteristic, at least one first set of FSRs with at least one first set of resistance vs. force characteristics forming a set of at least one series combination with at least one second set of FSRs with at least one second set of resistance vs. force characteristics, and the set of at least one series combination is a multiplicity of series combinations to create a larger total range resistance vs. force characteristic, and at least one first FSR is in series with at least one top FSR, and at least one second FSR is in series with at least one bottom FSR, and at least one top conductor is at least one drive line and at least one bottom conductor is at least one sense line or at least one bottom conductor is at least one drive line and at least one top conductor is at least one sense line.

At least one first FSR with at least one first resistance vs. force characteristic can be a multiplicity of first FSRs with a multiplicity of at least one first resistance vs. force characteristics and at least one second FSR with at least one second resistance vs. force characteristic can be a multiplicity of second FSRs with a multiplicity of at least one second resistance vs. force characteristics.

Embodiments may further comprise at least one insulation layer with a first side and a second side with at least one conductor printed and/or applied on the first side and at least one conductor printed and/or applied on the second side.

In some embodiments, there is provided an acceleration sensing fuseable crush switch comprising at least one top non-conductive substrate, at least one bottom non-conductive substrate, at least one top conductor connected and/or attached to at least one top non-conductive substrate, at least one bottom conductor connected and/or attached to at least one bottom non-conductive substrate, and at least one of at least one single FSR connected electrically and mechanically to at least one top conductor and at least one bottom conductor, and at least one single FSR having a first single resistance range below a threshold force and a second single resistance range above that threshold force, and a second single resistance range being permanently maintained after that threshold force is no longer applied, and/or a set of FSRs electrically and mechanically connected in series with one another, and contained within the set of FSRs is at least one top FSR in mechanical and electrical contact with at least one top conductor and at least one bottom FSR in mechanical and electrical contact with at least one bottom conductor, and the set of FSRs each having a constituent first resistance range below a set of corresponding threshold forces and a constituent second resistance range above the set of corresponding threshold forces being permanently maintained after the set of corresponding threshold forces is no longer applied, and at least one top FSR having at least one first top resistance range below a threshold force and a second top resistance range above a threshold force, and the second top resistance range being permanently maintained after the threshold force is no longer applied, and at least one bottom FSR having at least one first bottom resistance range below a threshold force and a second bottom resistance range above a threshold force, and the second bottom resistance range being permanently maintained after the threshold force is no longer applied.

Techniques operating according to the principles described herein may be implemented in any suitable manner. Included in the discussion above are a series of flow charts showing the steps and acts of various processes that use an array of pressure-sensitive sensors (e.g., but not limited to, FSRs) to detect and identify an item on a surface. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Embodiments are not limited to being implemented in any specific number, division, or type of functional facilities. In some implementations, all functionality may be implemented in a single functional facility. It should also be appreciated that, in some implementations, some of the functionality may be implemented together with or separately from other functionality.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as a portion of a computing device or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method of identifying an item disposed on a surface, wherein the surface comprises an array of sensors for detecting contact with the surface, the item having a bottom that comprises a plurality of bumps and is in contact with the surface, wherein the method comprises:
   determining, using the array of sensors to detect contact of the bottom of the item with the surface, an arrangement of the plurality of bumps on the bottom of the item, comprising, with the array of sensors, identifying a center of at least two bumps of the plurality of bumps;
   comparing the arrangement of the plurality of bumps to one or more known arrangements of bumps for one or more known items; and
   based at least in part on at least one result of the comparing, determining whether the item is at least one of the one or more known items.

2. The method of claim 1, wherein determining the arrangement of the plurality of bumps comprises:
   identifying a distance between each unique pair of bumps in the at least two bumps using the identified location of the at least two bumps.

3. The method of claim 2, wherein comparing the arrangement of the plurality of bumps to one or more known arrangements of bumps comprises:
   comparing the distance between each unique pair of two bumps in the at least two bumps with a set of one or more reference distances.

4. The method of claim 1, wherein:
   identifying the location of the at least two bumps of the plurality of bumps comprises identifying the location of at least three bumps of the plurality of bumps; and
   determining the arrangement of the plurality of bumps comprises identifying an angle formed by each unique pair of three bumps in the at least three bumps.

5. The method of claim 4, wherein comparing the arrangement of the plurality of bumps to one or more known arrangements of bumps comprises:
   comparing the angle between each unique pair of three bumps in the at least three bumps with a set of one or more reference angles.

6. The method of claim 1, wherein:
   determining the arrangement of the plurality of bumps comprises analyzing the contact between the bottom of the item and the surface to determine at least one code; and
   comparing the arrangement of the plurality of bumps to the one or more known arrangements of bumps comprises comparing the at least one code to one or more known codes.

7. The method of claim 1, wherein determining the arrangement of the plurality of bumps comprises detecting, using the array of sensors, a force imposed by the item on the surface at a set of points.

8. The method of claim 7, wherein detecting the force imposed by the item on the surface at the set of points comprises determining, from a weight value output by one or more sensors of the array of sensors, a normalized weight value.

9. The method of claim 7, wherein comparing the arrangement of the plurality of bumps to the one or more known arrangements of bumps comprises comparing forces and locations for each bumps of the plurality of bumps to the one or more known arrangements, wherein each known arrangement identifies a set of forces and respective locations of forces.

10. The method of claim 1, wherein determining the arrangement of the plurality of bumps using the array of sensors comprises determining the arrangement of the plurality of bumps using an array of force-sensing resistors (FSRs).

11. The method of claim 1, wherein determining the arrangement of the plurality of bumps comprises identifying a bump of the plurality of bumps at least in part by:
    determining a cluster of sensor readings using the array of sensors, the cluster of sensor readings corresponding to a feature of the item contacting the surface;
    determining a point of contact corresponding to the cluster of sensor readings to be a center of the cluster of sensor readings.

12. The method of claim 11, wherein determining the point of contact corresponding to the cluster of sensor readings to be a center of the cluster of sensor readings comprises determining the point of contact corresponding to the cluster of sensor readings from an analysis of a distribution of locations and/or values of the sensor readings of the cluster of sensor readings.

13. The method of claim 1, further comprising:
    repeating the method a plurality of times to identify a plurality of items disposed on the shelf; and
    outputting inventory information regarding the plurality of items disposed on the shelf, the inventory information identifying the plurality of items.

14. The method of claim 13, wherein repeating the method comprises repeating the method for a second plurality of items disposed on a second plurality of surfaces, each surface of the second plurality of surfaces comprising an array of the sensors.

15. The method of claim 1, further comprising:
    in response to identifying the item as one of the one or more known items, determining whether the surface is a proper location for the item to be disposed; and
    in response to determining that the item is not properly disposed on the surface, outputting a message identifying that the item is improperly disposed on the surface.

16. At least one non-transitory storage medium having encoded thereon executable instructions that, when executed by at least one processor, cause the at least one processor to carry out the method of claim 1.

17. An apparatus comprising:
    at least one processor; and
    at least one non-transitory storage medium having encoded thereon executable instructions that, when executed by the at least one processor, cause the at least one processor to carry out the method of claim 1.

* * * * *